United States Patent
Tao et al.

(10) Patent No.: US 11,250,702 B2
(45) Date of Patent: Feb. 15, 2022

(54) METHOD AND DEVICE FOR ASSISTING IN CONTROLLING AUTOMATIC DRIVING OF VEHICLE, AND SYSTEM

(71) Applicant: BAIDU ONLINE NETWORK TECHNOLOGY (BEIJING) CO., LTD., Beijing (CN)

(72) Inventors: Ji Tao, Beijing (CN); Tian Xia, Beijing (CN); Xing Hu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 231 days.

(21) Appl. No.: 16/575,138

(22) Filed: Sep. 18, 2019

(65) Prior Publication Data

US 2020/0090511 A1    Mar. 19, 2020

(30) Foreign Application Priority Data

Sep. 19, 2018  (CN) .......................... 201811096609.8

(51) Int. Cl.
*G01C 22/00* (2006.01)
*G05D 1/00* (2006.01)
(Continued)

(52) U.S. Cl.
CPC ..... *G08G 1/096783* (2013.01); *G05D 1/0219* (2013.01); *G05D 1/0251* (2013.01); *G08G 1/0116* (2013.01)

(58) Field of Classification Search
CPC .. G08G 1/096783; G08G 1/0116; G08G 1/04; G08G 1/164; G08G 1/166;
(Continued)

(56) References Cited

U.S. PATENT DOCUMENTS

2003/0045995 A1*  3/2003  Lee ................. G08G 1/096716
                                                             701/439
2012/0123640 A1*  5/2012  Mukaiyama ..... G08G 1/096741
                                                              701/36
(Continued)

FOREIGN PATENT DOCUMENTS

DE    102013005362 A1    10/2013
EP       2814014 A1      12/2014
(Continued)

OTHER PUBLICATIONS

Japanese Patent Application No. 2019-145988, Office Action dated Oct. 6, 2020, 5 pages.
(Continued)

*Primary Examiner* — Harry Y Oh
(74) *Attorney, Agent, or Firm* — Lathrop GPM LLP

(57) ABSTRACT

Embodiments of the present disclosure provide a method and a device for assisting in controlling automatic driving of a vehicle, a medium, and a system. The method for assisting in controlling automatic driving of a vehicle may include: acquiring sensing information related to environment collected by a sensor, the sensor being disposed in the environment and independent of the vehicle; determining an environment sensing result related to the environment by processing the acquired sensing information, the environment sensing result indicating relevant information about a plurality of objects including the vehicle in the environment; and providing the environment sensing result to a vehicle-side control device associated with the vehicle for assisting in controlling a driving behavior of the vehicle.

17 Claims, 3 Drawing Sheets

(51) Int. Cl.
*G08G 1/0967* (2006.01)
*G05D 1/02* (2020.01)
*G08G 1/01* (2006.01)

(58) Field of Classification Search
CPC .... G05D 1/0219; G05D 1/0251; G05D 1/021; G05D 1/0231; G05D 1/0242; G05D 1/0246; G05D 1/0278; G05D 1/0257; B60W 2556/40; B60W 60/00276; B60W 2556/45; B60W 30/0956; G01D 21/02
See application file for complete search history.

(56) References Cited

U.S. PATENT DOCUMENTS

| | | | | |
|---|---|---|---|---|
| 2013/0116859 | A1* | 5/2013 | Ihlenburg | B60W 10/18 701/2 |
| 2017/0072853 | A1* | 3/2017 | Matsuoka | G08G 1/166 |
| 2017/0129401 | A1* | 5/2017 | Matsuoka | B60Q 9/008 |
| 2017/0197626 | A1 | 7/2017 | Jammoussi et al. | |
| 2019/0096238 | A1* | 3/2019 | Ran | G08G 1/0968 |
| 2019/0287394 | A1* | 9/2019 | Aoude | G08G 1/096725 |

FOREIGN PATENT DOCUMENTS

| | | |
|---|---|---|
| JP | 2010003174 A | 1/2010 |
| JP | 2016053846 A | 4/2016 |
| JP | 2017102827 A | 6/2017 |
| JP | 2017102861 A | 6/2017 |

OTHER PUBLICATIONS

Japanese Patent Application No. 2019-145988, English translation of Office Action dated Oct. 6, 2020, 6 pages.
European Patent Application No. EP19198121.6, extended Search and Opinion dated Jan. 24, 2020, 7 pages.

* cited by examiner

METHOD AND DEVICE FOR ASSISTING IN CONTROLLING AUTOMATIC DRIVING OF VEHICLE, AND SYSTEM

CROSS-REFERENCE TO RELATED APPLICATION

This application claims priority to and benefit of Chinese Patent Application Serial No. 201811096609.8, filed with the State Intellectual Property Office of P. R. China on Sep. 19, 2018, the entire content of which is incorporated herein by reference.

FIELD

The present disclosure relates to the field of vehicle exterior interaction, and more particularly, to a method and a device for assisting in controlling automatic driving of a vehicle, and a vehicle infrastructure cooperative system.

BACKGROUND

Recently, automatic (also known as unmanned or autonomous) driving technologies have been evolving in a rapid pace. Auto-driving capability and features are increasingly expected or demanded by consumers. One of the bases of automatic driving technology is sensing the surrounding environment of vehicles, that is, identifying the specific conditions of the surrounding environment. On the basis of sensing environment, it is possible to further determine actions that a vehicle can take in the current environment, and then instruct and control the vehicle to perform such actions. In the current field of automatic driving, a vehicle needs to sense the surrounding environment. Therefore, the vehicle needs to be equipped with various sensing components, such as a laser radar.

SUMMARY

In a first aspect of the present disclosure, a method for assisting in controlling automatic driving of a vehicle is provided. In one embodiment, the method includes: acquiring sensing information related to environment collected by at least one sensor, the at least one sensor being disposed in the environment and independent of the vehicle; determining an environment sensing result related to the environment by processing the acquired sensing information, the environment sensing result indicating relevant information about a plurality of objects in the environment, the plurality of objects including the vehicle; and providing the environment sensing result to a vehicle-side control device associated with the vehicle for assisting in controlling a driving behavior of the vehicle.

In a second aspect of the present disclosure, a device for assisting in controlling automatic driving of a vehicle is provided. In one embodiment, the device includes: a communication module, configured to acquire sensing information related to environment collected by at least one sensor, the at least one sensor being disposed in the environment and independent of the vehicle; an information processing module, configured to determine an environment sensing result related to the environment by processing the acquired sensing information, the environment sensing result indicating relevant information about a plurality of objects in the environment, the plurality of objects including the vehicle. The communication module is further configured to provide the environment sensing result to a vehicle-side control device associated with the vehicle for assisting in controlling a driving behavior of the vehicle.

In a third aspect of the present disclosure, a device is provided. The device includes: one or more processors; and a storage device, configured to store one or more programs that, when executed by the one or more processors, causes the one or more processors to perform the method of the first aspect of embodiments of the disclosure is implemented.

In a fourth aspect of the present disclosure, a computer readable storage medium having computer programs stored thereon is provided. When the programs are executed by the processors, the method of the first aspect of embodiments of the disclosure is implemented.

In a fifth aspect of the present disclosure, a vehicle infrastructure cooperative system is provided. In one embodiment, the system includes: at least one sensor disposed in environment and independent of a vehicle, configured to collect sensing information related to the environment; a roadside assist device including the device of the second aspect of embodiments of the disclosure; and a vehicle-side control device, configured to control a driving behavior of the vehicle based on an environment sensing result provided by the roadside assist device.

It is to be understood that the content described in the summary part of the present disclosure is not intended to limit the key or important features of the embodiments of the present disclosure, or the scope of the present disclosure. Other features of the present disclosure will be readily understood by the following description.

BRIEF DESCRIPTION OF THE DRAWINGS

The above and other features, advantages and aspects of the various embodiments of the present disclosure will become more apparent from the accompanying drawings with reference to the following detailed description. In the accompanying drawings, the same or similar reference numerals indicate the same or similar elements, in which.

DETAILED DESCRIPTION

Figure 1:
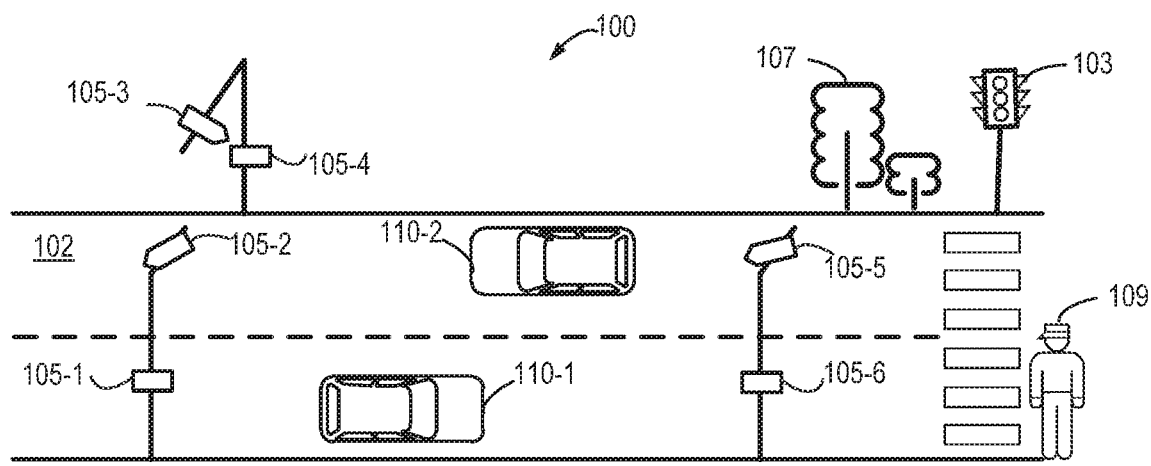
FIG. 1 is a schematic diagram of an exemplary environment in which various embodiments of the present disclosure can be implemented.

Embodiments of the present disclosure will be described in more detail below with reference to the accompanying drawings. Although certain embodiments of the present disclosure are shown in the drawings, it should be understood that the present disclosure may be embodied in various forms and should not be construed as being limited to the embodiments set forth herein. In contrast, these embodiments are provided to provide a more complete and clear understanding of the present disclosure. It should be understood that, the drawings and embodiments of the present disclosure are to be considered as illustrative only and is not intended to limit the scope of the present disclosure.

In the description of the embodiments of the present disclosure, the term "comprises" and the like should be understood as open-ended inclusion, that is, "including but not limited to". The term "based on" should be understood as "based at least in part on". The term "one embodiment" or "the embodiment" should be understood as "at least one embodiment". The terms "first", "second" and the like may refer to different or identical objects. Other explicit and implicit definitions may also be included below. For purpose of this disclosure, the term "automatic driving vehicle" means a vehicle capable of navigating roadways and/or interpreting traffic-control devices without a driver physically operating any of the vehicle's control systems As mentioned above, it is important to sense the ambient environment in order to support the automatic driving capability of vehicles. In traditional automatic driving techniques, the vehicle itself is required to be equipped with costly sensors to obtain the sensing capability. This not only economically increases the cost, but also hinders the improvement of the automatic driving capability of existing vehicles.

Generally, the accuracy and cost of the sensor are often directly proportional. If the cost of the sensor is reduced in order to save costs, it is bound to bring a decline in the sensing performance, or more sensors with low performance are required to cooperate with each other to reduce the sensing blind region as much as possible. In the event of damage to the on-board sensor during use, additional vehicle or component repairs incur additional costs. Furthermore, the production cost and maintenance cost of such sensing components are high, and the components may not be reused as the vehicle is updated. For example, the sensors mounted on the vehicle are generally adapted to the design and manufacture of the vehicle itself, therefore the sensors may not be reused as the vehicle is scrapped. On the other hand, the high demand for the vehicle's own sensing capability makes it difficult to upgrade a non-automatic driving vehicle or a vehicle having a weak automatic driving capability to a vehicle having a strong automatic driving capability simply and at low cost. It is usually only possible to acquire an upgrade of the vehicle's automatic driving capability by changing the vehicle.

Embodiments of the present disclosure provide a solution for controlling automatic driving with external sensing assistance. In this solution, the sensing information related to the environment is collected by the sensor disposed in the ambient environment of the vehicle and independent of the vehicle. The sensing result related to the environment is determined based on such sensing information. A self-vehicle sensing result corresponding to the vehicle is excluded from such environment sensing result, and a vehicle exterior sensing result is acquired for controlling the driving behavior of the vehicle. A sensor external to the vehicle is employed to sense the environment, which can reduce requirement for the sensing capability of the vehicle itself, thereby automatic driving capability of non-automatic driving vehicles or vehicles with a weak automatic driving capability can be simply enhanced at low cost. The sensor external to the vehicle may also be employed to assist in controlling the automatic driving of a plurality of vehicles in the environment, thus improving the utilization of the sensor.

Embodiments of the present disclosure will be described in detail below with reference to the drawings.

Exemplary Environment and System

FIG. 1 is a schematic diagram of an exemplary environment 100 in which various embodiments of the present disclosure can be implemented. Some typical objects are schematically illustrated in the exemplary environment 100, including a road 102, a traffic indication facility 103, plants 107 on both sides of the road, and pedestrians 109 that may appear. It should be understood that the illustrated facilities and objects are merely examples, and objects that may appear in different traffic environments may vary depending on the actual situation. The scope of the present disclosure is not limited in this aspect.

In the example illustrated in FIG. 1, one or more vehicles 110-1 and 110-2 are traveling on the road 102. For convenience of description, the plurality of vehicles 110-1 and 110-2 are collectively referred to as the vehicles 110. The vehicles 110 may be any type of vehicle that can carry people and/or objects and be driven by a power system such as an engine, including but not limited to cars, trucks, buses, electric vehicles, motorcycles, motor homes, and trains. The one or more vehicles 110 in the environment 100 may be a vehicle having a certain automatic driving capability, such vehicles are referred to as unmanned vehicles. Certainly, one or more of other vehicles 110 in the environment 100 may also be vehicles without the automatic driving capability.

One or more sensors 105-1 to 105-6 (collectively referred to as sensors 105) are also disposed in the environment 100. The sensors 105 are independent of the vehicle 110 and configured to monitor the condition of the environment 100 to acquire sensing information related to the environment 100. To omnidirectionally monitor the environment 100, the sensors 105 can be disposed adjacent to the road 102 and can include one or more types of sensors. For example, the sensors 105 may be arranged on both sides of the road 102 at certain intervals to monitor a particular region of the environment 100. Various types of sensors can be arranged in each region. In some examples, in addition to fixing the sensors 105 to a particular position, movable sensors 105, such as mobile sensing sites, can be provided.

Figure 2:
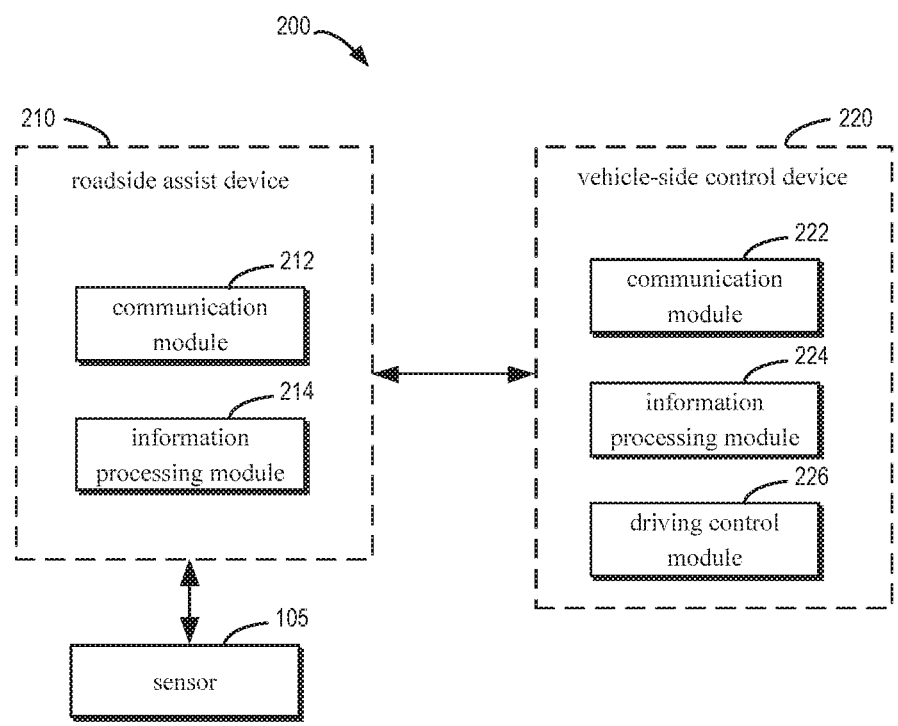
FIG. 2 is a block diagram of a vehicle infrastructure cooperative system according to an embodiment of the present disclosure.

The sensing information collected by the sensors 105 arranged corresponding to the road 102 may also be referred to as roadside sensing information. The roadside sensing information can be used to facilitate driving control of the vehicles 110. In order to realize controlling automatic driving of the vehicles 110 using the roadside sensing information, the roadside and the vehicle side may cooperatively perform control of the vehicle. FIG. 2 illustrates a schematic diagram of such a vehicle infrastructure cooperative system 200. For ease of description, the vehicle infrastructure cooperative system 200 will be discussed below in combination with FIG. 1.

The vehicle infrastructure cooperative system 200 includes the sensors 105, a roadside assist device 210 for assisting the automatic driving of the vehicles 110, and a vehicle-side control device 220 for controlling the automatic driving of the vehicle 110. The roadside assist device 210 is also sometimes referred to herein as a device for assisting automatic driving of a vehicle. The roadside assist device 210 is used in combination with the environment 100 to assist in controlling the automatic driving of the vehicle in the environment 100. The roadside assist device 210 can be installed at any position, as long as the roadside assist device 210 can communicate with the sensors 105 and the vehicle-side control device 220 respectively. Since both the sensors 105 and the roadside assist device 210 are deployed on the roadside, the sensors 105 and the roadside assist device 210 may also constitute a roadside assist subsystem.

The vehicle-side control device 220 is also sometimes referred to herein as a device for controlling automatic driving of the vehicle 110. The vehicle-side control device 220 is used in association with a corresponding vehicle 110, for example, integrated into the vehicle 110 to control the automatic driving of the vehicle 110. The vehicle-side control device 220 may be provided on one or more vehicles 110 in the environment 100 respectively. For example, one vehicle-side control device 220 may be integrated on the vehicle 110-1, and similarly, one vehicle-side control device 220 may also be integrated on the vehicle 110-2. In the following, corresponding functions of the vehicle-side control device 220 are described specified for one vehicle 110.

The roadside assist device 210 includes a communication module 212 and an information processing module 214. The communication module 212 can support wired/wireless communication with the sensor 105 and be configured to acquire collected sensing information related to the environment 100 from the sensor 105. The communication module 212 may also support communication with the vehicle-side control device 220, and such communication is typically wireless communication. The communication between the communication module 212 and the sensor 105 and the communication between the communication module 212 and the vehicle-side control device 220 may be based on any communication protocol, and implementations of the present disclosure are not limited in this aspect.

As mentioned above, in order to omnidirectionally monitor the environment 100, the sensors 105 disposed in the environment 100 may include various types of sensors. Examples of the sensors 105 may include, but are not limited to, an image sensor (e.g., a camera), a laser radar, a millimeter wave radar, an infrared sensor, a positioning sensor, a light sensor, a pressure sensor, a temperature sensor, a humidity sensor, a wind speed sensor, a wind direction sensor, an air quality sensor and the like. The image sensor can collect image information related to the environment 100. The laser radar and the millimeter wave radar can collect laser point cloud data related to the environment 100. The infrared sensor can use infrared rays to detect the environmental condition in the environment 100. The positioning sensor can collect position information of an object related to the environment 100. The light sensor can collect measurements indicating light intensity in the environment 100. The pressure sensor can collect measurements indicating pressure in the environment 100. The temperature sensor can collect measurements indicating temperature of the environment 100. The humidity sensor can collect measurements indicating humidity of the environment. The wind speed sensor and the wind direction sensor may respectively collect measurements indicating a wind speed and a wind direction in the environment 100. The air quality sensor can collect some air quality related indexes in the environment 100, such as oxygen concentration in the air, carbon dioxide concentration, dust concentration, pollutant concentration, and the like. It should be understood that only some examples of the sensors 105 are listed above. Other different types of sensors can also exist depending on actual needs. In some embodiments, different sensors may be integrated at a certain position or may be distributed in one region of the environment 100, configured to monitor particular types of roadside sensing information.

Since data amount of the sensing information directly collected by the sensors 105 is large and diverse, if the sensing information collected by the sensors 105 is directly transmitted to the vehicle-side control device 220, not only a large communication transmission expense is caused, but also the communication resources may be excessively occupied, and the same sensing information may need to be processed separately by different vehicles, resulting in a reduction in overall system performance. In the implementation of the present disclosure, the sensing information collected by the sensors 105 is centrally processed by the roadside assist device 210, specifically by the information processing module 214 in the roadside assist device 210.

The information processing module 214 of the roadside assist device 210 processes the sensing information acquired from the sensors 105 to determine an environment sensing result related to the environment 100. The environment sensing result may indicate an overall understanding of the condition of the environment 100, and may specifically indicate related information about a plurality of objects including the vehicle 110 in the environment. Such related information includes a size, a position (e.g., a precise position in an earth coordinate system), a speed, a moving direction of each object, a distance from a particular viewpoint, and the like. The information processing module 214 can fuse different types of sensing information from different sensors 105 to determine the environment sensing result. The information processing module 214 can employ various different information fusion techniques to determine the environment sensing result.

In order to ensure safe driving of the vehicle 110, the accuracy of the relevant information of each object provided by the environment sensing result should be high. The specific processing performed by the roadside assist device 210 on the sensing information collected by the sensor 105 will be described in detail below. The communication module 212 in the roadside assist device 210 is configured to transmit the environment sensing result acquired after processed by the information processing module 214 to the vehicle-side control device 220.

The vehicle-side control device 220 controls the corresponding vehicle 110, for example, the driving behavior of a vehicle mounted with the vehicle-side control device 220, based on the environment sensing result acquired from the roadside assist device 210. The vehicle-side control device 220 includes the communication module 222, the information processing module 224, and a driving control module 226. The communication module 222 is configured to be communicatively coupled to the roadside assist device 210, particularly coupled to the communication module 212 in the roadside assist device 210, to receive environment sensing result from the communication module 212. The information processing module 224 is configured to process the environment sensing result to make the environment sensing result adaptive to controlling the automatic driving of the vehicle 110. The driving control module 226 is configured to control the driving behavior of the vehicle 110 based on a processing result of the information processing module 224.

Vehicle-Side Driving Control

How the vehicle-side control device 220 performs automatic driving control of the vehicle 110 will be described in detail below.

The communication module 222 of the vehicle-side control device 220 may acquire the environment sensing result related to the ambient environment 100 of the vehicle 110 from the roadside assist device 210. Such environment sensing result is based on the sensing information collected by one or more sensors 105 disposed in the environment 100 and independent of the vehicle 110, and indicates relevant information of a plurality of objects in the environment 100, such as a size, a position (e.g. the precise position in the earth coordinate system), a speed, a moving direction of the object, a distance from a particular viewpoint and the like.

In some embodiments, in addition to acquiring environment sensing result from the roadside assist device 210, the vehicle-side control device 220 may also acquire the environment sensing result from sensors integrated on other vehicles in the environment 100 as a supplement. Some vehicles in the environment 100 may have sensors having a strong sensing capability (such as laser radar) or sensors with general sensing capability (such as a camera). The sensing information collected by these sensors may also contribute to assist in controlling the automatic driving of other vehicles. For a certain vehicle (e.g., vehicle 110-1), the vehicle-side control device 220 associated with the vehicle 110-1 may acquire original sensing information from sensors on other vehicles (e.g., vehicle 110-2) or acquire sensing result acquired after processing the original sensing information.

Generally, a sensor equipped on the vehicle detects the ambient environment from the perspective of the vehicle itself, thus the acquired sensing information does not include information related to the vehicle itself. However, since the sensors outside the vehicle (such as roadside sensors or sensors on other vehicles) monitor the entire environment from the perspective of the respective sensors instead of from the perspective of the vehicle, these sensors monitor relevant information of the vehicle and other objects without distinction, and thus the collected information contains sensing information of objects in the entire environment.

The information processing device 224 in the embodiments of the present disclosure excludes a self-vehicle sensing result corresponding to the vehicle 110 from the environment sensing result to determine a vehicle exterior sensing result of the vehicle 110. The self-vehicle sensing result may refer to information related to the vehicle 110 itself in the environment sensing result, for example, information such as the size, the position, the speed, the direction of the vehicle 110, the distance from a particular viewpoint, and the like. The vehicle exterior sensing result includes relevant information about objects other than the vehicle 110. During the driving of the vehicle 110, the vehicle 110 is required to treat the objects other than the vehicle itself as obstacles, thereby reasonably planning a driving path and avoiding collision with the obstacles. In the embodiments of the present disclosure, the vehicle exterior sensing result is more suitable for controlling automatic driving of the vehicle 110 by identifying and excluding the self-vehicle sensing result from the environment sensing result.

In order to determine the vehicle exterior sensing result of the vehicle 110 from the overall environment sensing results, in some embodiments, the vehicle 110 may be equipped with a label portion for identifying the vehicle 110. Such label portion may include one or more of the following: a license plate of the vehicle 110, a two-dimensional code attached to exterior of the vehicle 110, a non-visible label attached to the exterior of the vehicle 110, and a radio frequency label mounted on the vehicle 110.

Motor vehicles that travel on roads are usually fitted with license plates for uniquely identifying the respective vehicles. In some cases, for a vehicle without a license plate or the license plate is blocked, a two-dimensional code specific to the vehicle 110 may be attached outside the vehicle 110 as the label portion of the vehicle. The license plate and/or the two-dimensional code of the vehicle 110 can be identified from the image information acquired by the image sensor. In some examples, in order not to affect the appearance of the vehicle, the non-visible label, such as an infrared label and an ultraviolet reflective label, may be attached to the vehicle 110 for identifying the vehicle 110. Such non-visible label can be identified by a non-visible sensor. Alternatively, or additionally, the radio frequency label mounted on the vehicle 110 can also be used to identify the vehicle 110. The radio frequency label can transmit a signal, and the vehicle 110 can be identified by reading the transmitted signal by a radio frequency reader.

With the label portion of the vehicle 110, the information processing module 224 can identify identification information related to the label portion of the vehicle 110 from the environment sensing result. Such identification information may be, for example, image information of the license plate or the two-dimensional code the vehicle 110, indication information indicating specific signals of the non-visible label and the radio frequency label. The information processing module 224 identifies the corresponding identification information by matching the identification indicated by the label portion of the vehicle with the environment sensing result. Then, the information processing module 224 determines the self-vehicle sensing result corresponding to the vehicle 110 in the environment sensing result based on the identification information. Generally, the roadside assist device 210 combines related information of each object. Therefore, other information related to the vehicle 110 in the environment sensing result, such as the position and the size of the vehicle 110, may be determined based on the identification information of the vehicle 110.

In some embodiments, in addition to identifying the vehicle 110 itself by using the label portion equipped to the vehicle, the self-vehicle sensing result in the environment sensing result may also be identified based on the position of the vehicle 110. As mentioned above, the environment sensing result can include the positions of the plurality of objects. The information processing module 224 can utilize various positioning techniques to determine the position of the vehicle 110, then match the position of the vehicle 110 with the positions of the plurality of objects in the environment sensing result, and identify an object that match the vehicle 110 from the plurality of objects. In this manner, the information processing module 224 can identify which object in the environment sensing result is the vehicle 110 itself. Thus, the information processing module 224 can exclude the sensing result corresponding to the object matching the vehicle 110 from the environment sensing result and acquire the vehicle exterior sensing result.

When determining the vehicle exterior sensing result based on position matching, the position of the vehicle 110 may be a precise position of the vehicle 110 (e.g., having a precision similar to a precision of the position of the object included in the environment sensing result) or may be an approximate position of the vehicle 110 (for example, sub-meter-level positioning). When the objects in the environment 100 are at a large distance from each other, the matching objects at the overlapping positions may be also accurately matched from the environment sensing result based on the approximate position of the vehicle 110. In some embodiments, the position of the vehicle 110 may be determined by a positioning device provided in the vehicle 110, such as a global positioning system (GPS) antenna, a position sensor, and the like. The vehicle 110 may also be positioned based on other positioning techniques, such as a base station in communication with the communication module 222 and/or the roadside assist device 210 disposed in the environment 100, or any other technique.

After identifying the self-vehicle sensing result of the vehicle 110, the information processing module 224 may delete or ignore the self-vehicle sensing result corresponding to the vehicle 110 in the environment sensing result, and only consider other environment sensing result (i.e., vehicle exterior sensing result). The vehicle exterior sensing result is used by the driving control module 226 in the vehicle-side control device 220 to control the driving behavior of the vehicle 110. The driving control module 226 can utilize various automatic driving strategies to control the driving behavior of the vehicle 110 based on the known vehicle exterior sensing result. The driving behavior of the vehicle 110 may include a traveling route, a traveling direction, a traveling speed, and the like of the vehicle 110. The driving control module 226 may generate specific operation instructions for the driving behavior of the vehicle 110, such as operation instructions for a travel system, a steering system of the vehicle, such that the vehicle 110 can be driven according to such operation instructions. The operation instructions may be any commands related to the driving of the vehicle 110, for example, accelerating, decelerating, left steering, right steering, parking, whistling, turning the lights on or off, and the like.

In some embodiments, when controlling the driving behavior of the vehicle 110, the driving control module 226 can determine a behavior prediction of one or more objects (i.e., obstacles) in the environment 100 based on the vehicle exterior sensing result. The behavior prediction includes one or more aspects of an expected moving trajectory, an expected moving speed, an expected moving direction, and the like of an object. The behavior prediction of the objects is also useful for controlling the automatic driving of the vehicle, since the controlling of the automatic driving of the vehicle is often required to judge how the objects around the vehicle are about to move so as to adopt the corresponding driving behavior to respond to. In some embodiments, the driving control module 226 can perform the behavior prediction based on a pre-trained prediction model. Such prediction model may, for example, be a general behavior prediction model or include different prediction models for different types of objects. The driving control module 226 can determine the driving behavior of the vehicle 110 based on the behavior prediction of the object.

In some embodiments, when controlling the driving behavior of the vehicle, the information processing module 224 controls the driving of the vehicle based on the position of the vehicle 110 in addition to the vehicle exterior sensing result. Generally, for accurate and safe automatic driving control, it is desirable to learn the precise position of the vehicle 110. In an embodiment, the vehicle 110 may be equipped with a sensor capable of performing precise positioning. In another embodiment, the precise position of the vehicle 110 can also be determined from the environment sensing result, which can also reduce the requirement for precise positioning hardware of the vehicle 110 and improve positioning accuracy and stability.

As discussed above, the environment sensing result includes a higher precision position of the vehicle 110. The precise position used in controlling the automatic driving of the vehicle 110 can be determined from the environment sensing result. In such an embodiment, the vehicle-side control device 220 can include a vehicle positioning module (not shown). The vehicle positioning module is configured to identify the vehicle 110 from the environment sensing result by way of position matching.

In detail, the vehicle positioning module may first determine an approximate position of the vehicle 110, such as a position obtained by a GPS antenna of the vehicle 110 or by an auxiliary device such as a base station. The vehicle positioning module determines an object that matches the vehicle 110 from the environment sensing result based on the approximate position of the vehicle 110, and determines the position of the object that matches the vehicle 110 in the environment sensing result as a fine position of the vehicle 110 (i.e., a position with higher precision). In this manner, the precise position of the vehicle 110 can be acquired for controlling the driving behavior of the vehicle 110 without requiring the vehicle 110 or the vehicle-side control device 220 to be provided with a precise in-vehicle positioning device.

In other embodiments, as discussed above, the self-vehicle sensing result corresponding to the vehicle 110 may also be identified by the label portion equipped to the vehicle 110. Thus, the precise position of the vehicle 110 can be acquired from the identified self-vehicle sensing result. This allows the vehicle 110 to be accurately positioned even without the need for an in-vehicle positioning device.

In some embodiments of the present disclosure, the vehicle-side control device 220 may acquire other assistant driving information for assisting the automatic driving of the vehicle 110 in addition to acquiring the environment sensing result from the roadside assist device 210. In one embodiment, the communication module 222 of the vehicle-side control device 220 may acquire the behavior prediction for one or more objects in the environment 100 from the roadside assist device 210 (e.g., from the communication module 214). The behavior prediction includes one or more aspects of an expected moving trajectory, an expected moving speed, an expected moving direction, and the like of an object. In another embodiment, the communication module 222 of the vehicle-side control device 220 may acquire an automatic driving recommendation for the vehicle 110 from the roadside assist device 210 (e.g., from the communication module 214). The automatic driving recommendation includes one or more of a driving path recommendation and a driving direction recommendation of the vehicle 110, specific operation instructions for controlling the driving behavior of the vehicle, and the like.

In addition to the vehicle exterior sensing result, the driving control module 226 of the vehicle-side control device 220 may also control the driving behavior of the vehicle 110 based on the behavior prediction and/or the automatic driving recommendation regarding the objects acquired from the roadside assist device 210. The vehicle-side control module 226 may refer to or adjust the behavior prediction and/or the automatic driving recommendation acquired from the roadside assist device 210 during controlling the driving behavior of the vehicle 110 so as to determine the actual driving behavior of the vehicle 110.

Performing the behavior prediction and the automatic driving recommendation by the roadside assist device 210 can further reduce the requirement for the automatic driving capability of the vehicle 110 itself or the vehicle-side control device 220, and reducing complexity of the processing and the control at the vehicle side. For example, according to a simple automatic driving control strategy, the vehicle-side control device 220 may determine the driving behavior of the vehicle 110 based on the behavior prediction and/or the automatic driving recommendation acquired from the roadside assist device 210 in combination with actual vehicle exterior sensing result.

It has been described above that the vehicle-side control device 220 may acquire the environment sensing result from the roadside assist device 210 and may further acquire the behavior prediction and/or the automatic driving recommendation of the object to control the driving behavior of the vehicle 110. In the above embodiment, the sensor 105 and the roadside assist device 210 undertake a sensing function for the ambient environment of the vehicle 110, and may also provide assist driving information such as the behavior prediction and/or the automatic driving recommendation. The environment sensing result acquired by the roadside assist device 210 and the sensor 105, as well as other assist driving information, can be provided to a plurality of vehicles 110 in the environment 100, enabling centralized environment sensing and information processing.

Under such an implementation, the automatic driving can be realized without requiring the vehicle 110 to have a strong environment sensing capability, a self-positioning capability, a behavior prediction capability, and/or an automatic driving planning capability. The increase in the automatic driving capability of the vehicle 110 can be achieved by integrating the vehicle-side control device 220. For example, the functions of the vehicle-side control device 220 can be integrated into the vehicle 110 by upgrading a software system of the vehicle 110 and by adding communication functions or by means of communication functions of the vehicle 110 itself. In addition, by proving the behavior prediction capabilities and/or the automatic driving recommendations by the roadside assist device 210, and the consistence of the automatic driving process of the vehicle 110 can be secured in the event that hardware and/or software of the vehicle 110 fails to perform the behavior prediction and the driving planning.

In a specific example, if the roadside assist device 210 and the sensor 105 are deployed in a certain road section of a vehicle traveling road system a vehicle 110 traveling to the road section can acquire more powerful automatic driving capability just by integrating the vehicle-side control device 220. In some cases, a vehicle 110 that does not have the automatic driving capability (e.g., a vehicle classified to L0 and L1 levels of an automatic driving classification) or a vehicle 110 having a weak driving capability (e.g., a vehicle in L2 level) can acquire more powerful automatic driving capability (e.g., automatic driving vehicles classified to L3 or L4 level) with the aid of the environment sensing result.

Roadside Assist Driving Control

The above embodiment mainly describes specific implementations of the vehicle-side control device 220 in the coordination control system 200 illustrated in FIG. 2. Some embodiments of the roadside assist device 210 in the coordination control system 200 will be further described below.

The roadside assist device 210 in the embodiments of the present disclosure acquires the sensing information of the sensor 105 and determines the environment sensing result by processing the sensing information. The roadside assist device 210 then provides the environment sensing result to the vehicle-side control device 220 for assisting in controlling the driving behavior of the vehicle 110.

In some embodiments, to further reduce the processing complexity of the vehicle-side control device 220, the roadside assist device 210 may determine the vehicle exterior sensing result corresponding to one or more vehicles 110 from the environment sensing result, and provide the vehicle exterior sensing result to the vehicle-side control device 220. That is, the sensing result provided by the roadside assist device 210 to the respective vehicle 110 is a vehicle exterior sensing result for each vehicle that can be directly used for controlling the driving of these vehicles. In detail, the information processing module 214 of the roadside assist device 210 excludes a self-vehicle sensing result corresponding to a certain vehicle 110 from the environment sensing result, thereby determining the vehicle exterior sensing result of the vehicle 110. The roadside assist device 210 then provides the determined vehicle exterior sensing result to the vehicle-side control device associated with the vehicle for assisting in controlling the driving behavior of the vehicle.

A manner in which the information processing module 214 identifies the vehicle exterior sensing result of a certain vehicle 110 is similar to that employed by the vehicle-side control device 220. For example, the information processing module 214 can also identify the vehicle 110 based on the label portion of the vehicle 110. For example, the label portion may include one or more of a license plate of the vehicle 110, a two-dimensional code, a non-visible label, and a radio frequency label. In detail, the information processing module 214 identifies the identification information related to the label portion equipped to the vehicle 110 from the environment sensing result, and then determines the self-vehicle sensing result corresponding to the vehicle 110 in the environment sensing result based on the identification information. The information processing module 214 can exclude the self-vehicle sensing result from the environment sensing result to acquire the vehicle exterior sensing result to be provided to the vehicle-side control device 220.

In some embodiments, in order to determine the environment sensing result from the sensing information acquired by the sensor 105 more quickly and accurately, the information processing module 214 may also determine the environment sensing result by means of a static high-precision map associated with the environment 100. The static high-precision map includes information about static objects in the environment 100. The static high-precision map may be generated based on information related to the environment 100 that is pre-collected by the sensor 105 disposed in the environment 100. The static high-precision map only includes information about objects in the environment 100 that protrude from the ground and remain stationary for a relatively long period of time.

Figure 3:
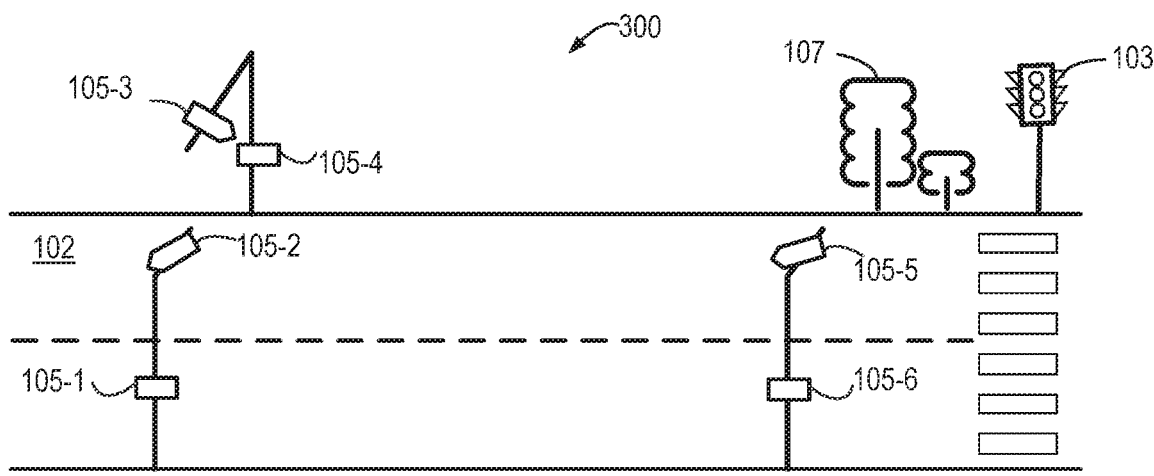
FIG. 3 is a schematic diagram of an exemplary static map according to an embodiment of the present disclosure.

FIG. 3 illustrates a schematic diagram of an example static high-precision map 300 associated with the environment 100 of FIG. 1. Compared with the environment 100, the static high-precision map 300 only includes stationary objects, such as a pole to which the sensor 105 is disposed, a traffic indication facility 103, plants 107 on both sides of the road. These objects remain stationary for a period of time. Objects such as vehicles 110 and pedestrians 109 may appear in the environment 100 sometimes, and may disappear from the environment 100 sometimes, or move in the environment 100. Therefore, such objects are called a dynamic object.

It should be understood that the static high-precision map 300 illustrated in FIG. 3 is presented for purposes of illustration only. In general, in addition to schematically showing an object or giving an image of an object, the high-precision map also marks other information of the objects, such as a precise position, a speed, a direction. In some implementations, the static high-precision map includes a three-dimensional static high-precision map that includes related information of the objects in three-dimensional space.

At the beginning, a static high-precision map, such as the static high-precision map 300, may be generated based on the information related to the environment 100 collected by a high-precision map collection vehicle. The static high-precision map associated with the environment 100 can also be updated periodically or triggered by a corresponding event. An update period of the static high-precision map can be set to a relatively long period of time. The update of the static high-precision map may be based on the sensing information collected by the sensor 105 that monitor the environment 100 in real time and disposed in the environment 100.

When using the static high-precision map to determine the environment sensing result, the environment sensing result may reflect real-time status of the environment 100 for the purpose of automatic driving. Therefore, the information processing module 214 can utilize the real-time sensing result provided by the sensor 105 to update the static high-precision map to acquire a real-time high-precision map associated with the environment 100 as the environment sensing result. When updating the static high-precision map, the sensing information from the sensor 105 and the static high-precision map can be merged, and the dynamic objects in the sensing information and the related information of the dynamic objects are combined into the static high-precision map.

When determining the environment sensing result, the usage of the static high-precision map can correct or delete an object that may be erroneously detected in the real-time sensing information, thereby improving the accuracy of the environment sensing result. For example, due to an error of the real-time sensing information, a certain object in the environment 100 is detected to have a certain speed, while it can be determined that the object is actually a static object by combining the static high-precision map, thereby avoiding erroneous marking of the object speed to affect controlling the automatic driving of the vehicle 100.

In some embodiments, the static high-precision map contributes to label the precise position of objects in the environment 100, such precise positions may form a part of the environment sensing result. In detail, the information processing module 214 can utilize the image sensing information in the sensing result collected by the sensor 105. The information processing module 214 identifies the objects in the environment from the image sensing information, the identified objects including the static objects in the environment as well as other objects (e.g., dynamic objects newly entering the environment 100). This can be achieved by image processing techniques for object identification.

Then, the information processing module 214 determines positions of the other objects according to the position of the static object indicated by the static high-precision map based on a relative position relationship between the identified static object and the other objects. The image sensing information acquired by the image sensor generally cannot indicate a geographic position of the object therein, such as a specific position in the earth coordinate system. However, the image sensing information may reflect the relative position relationship between different objects. Based on such relative position relationship, precise positions of other objects can be determined from the position of the static object indicated by the known static high-precision map. When determining the positions of other objects, absolute geographical positions of other objects in the environment 100 can also be determined by referring to a conversion relationship of the static object from the image sensing information to the static high-precision map. Object positioning by using the static high-precision map can quickly and accurately acquire high-precision positions, thereby reducing the computational overhead required by precise positioning.

As mentioned above in the discussion about the vehicle-side control device 220, in addition to providing the environment sensing result or the vehicle exterior sensing result, the roadside assist device 210 can also process the environment sensing result to acquire other assist driving information of one or more vehicles in the environment 100, such as the behavior prediction of the object in the environment 100 and/or the automatic driving recommendation for a particular vehicle 110. How to determine the behavior prediction of the object and the automatic driving recommendation of the vehicle in the roadside assist device 210 will be discussed in detail below.

In some embodiments, the roadside assist device 210 further includes a behavior prediction module (not shown) configured to determine behavior prediction of one or more objects in the environment 100 based on the environment sensing result. The determined prediction behavior is provided to the vehicle-side control device 220 via the communication module 212 for further assisting in controlling the driving behavior of the corresponding vehicle 110. The behavior prediction of the object includes one or more aspects of the expected moving trajectory, the expected moving speed, the expected moving direction and the like of the object. The behavior prediction of the object is also useful for controlling the automatic driving of the vehicle, because controlling the automatic driving of the vehicle often requires to judge how the objects around the vehicle are about to move so as to adopt a corresponding driving behavior to respond to.

In some embodiments, the behavior prediction module of the roadside assist device 210 can utilize a prediction model specific to a position or a region in which the sensor 105 is located to determine the behavior prediction of the object. Unlike a general prediction model for all objects or different types of objects used at the vehicle side, the prediction model local to the sensor 105 can be trained based on behaviors of the objects appearing in the region where the sensor 105 is located. Training data used to train the prediction model may be previously recorded behaviors of the one or more objects in the region where the sensor 105 is located.

Objects that appear in different geographic regions may present specific behavior patterns associated with the regions. For example, if the sensor 105 is placed near a tourist attraction, walking of a pedestrian in this region may be less directional, similar to a wandering pattern. If the sensor 105 is placed close to an office site such as an office building, walking of a pedestrian in this region may be more purposeful, such as going to one or more particular building. Therefore, by training the prediction model specific to a region, a behavior to be occurred in a particular region may be predicted more accurately.

In some embodiments, the roadside assist device 210 further includes a driving recommendation module (not shown) configured to determine an automatic driving recommendation for the one or more vehicles 110 based on the environment sensing result. The automatic driving recommendation may include a travel route recommendation of the vehicles 110, a travel direction recommendation of the vehicles 110, or may even include a recommendation of specific operational instructions for controlling the driving behavior of the vehicles 110. The automatic driving recommendation determined by the driving recommendation module is provided to the vehicle-side control device 220 via the communication module 212 for further assisting in controlling the driving behavior of the corresponding vehicle 110.

In some embodiments, the driving recommendation module of the roadside assist device 210 utilizes a recommendation model specific to the region in which the sensor 105 is located to determine the automatic driving recommendation. The recommendation model is trained based on driving behaviors performed by the vehicle in the region in which the sensor 105 is located. Data used to train the recommendation model may be previously recorded driving behaviors performed by one or more vehicles in the region where the sensor 105 is located. In different geographic regions, a vehicle may present a particular driving behavior pattern associated with the regions. For example, at a crowded intersection, the vehicle may perform a deceleration operation in advance. At some intersections, more vehicles may turn left. By training the recommendation model specific to the regions, a driving behavior of the vehicle suitable for executing in a specific region may be provided more accurately.

In some embodiments, the roadside assist device 210 may also provide other assist driving information to the vehicle-side control device 220, such as traffic conditions, accident conditions in the environment 100 monitored by the sensor 105. Such information contributes to the vehicle-side control device 220 to more accurately and reasonably control the driving behavior of the vehicle 110.

The roadside assist device 210 and the sensor 105 in the embodiments of the present disclosure collectively provide the environment sensing result to the vehicle-side control device 220 and may also provide the behavior prediction and/or the automatic driving recommendation for the object, to assist in controlling the driving behavior of the vehicle 110. The environment sensing result acquired by the roadside assist device 210 and the sensor 105, as well as other assist driving information, can be provided to a plurality of vehicles 110 in the environment 100, thereby realizing centralized environment sensing and information processing.

Under such an implementation, the automatic driving can be realized without requiring the vehicle 110 to have a strong environment sensing capability, a self-positioning capability, a behavior prediction capability, and/or an automatic driving planning capability. The increase in the automatic driving capability of the vehicle 110 can be achieved by integrating the vehicle-side control device 220. For example, the functions of the vehicle-side control device 220 can be integrated into the vehicle 110 by upgrading a software system of the vehicle 110 and by adding communication functions or by means of communication functions of the vehicle 110 itself. In addition, by proving the behavior prediction capabilities and/or the automatic driving recommendations by the roadside assist device 210, and the consistence of the automatic driving process of the vehicle 110 can be secured in the event that hardware and/or software of the vehicle 110 fails to perform the behavior prediction and the driving planning.

Functions such as implementing environmental sensing results, behavior prediction of objects, and/or automatic driving control of vehicles implemented by the roadside assist device 210 are described above. In some embodiments, one, some, or all of these functions may be performed by other devices having a greater computing power, such as performed by a cloud, an edge computing site, a base station on a roadside, a server, or the like. The roadside assist device 210 can provide the sensing information of the sensor 105 to a corresponding processing device, acquire a processing result, and provide the processing result to the vehicle-side control device 220.

Vehicle-Side Exemplary Process

Figure 4:
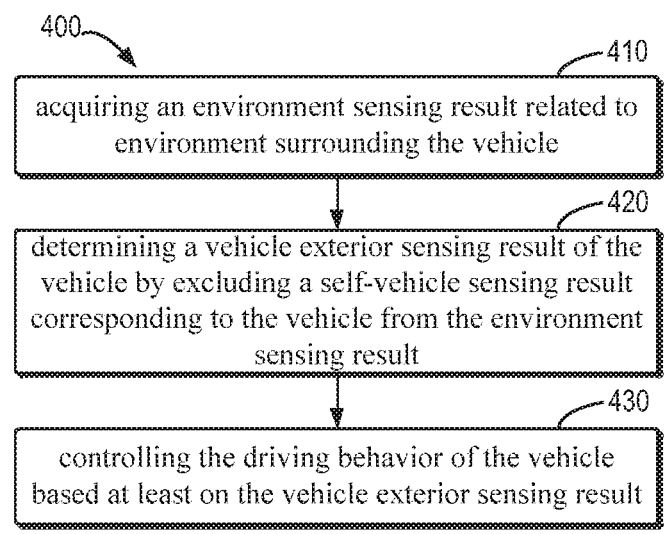
FIG. 4 is a flow chart of a process for controlling automatic driving of a vehicle according to an embodiment of the present disclosure.

FIG. 4 is a flow chart of a method 400 for controlling automatic driving of a vehicle according to an embodiment of the present disclosure. The method 400 can be implemented by the vehicle-side control device 220 illustrated in FIG. 2. At block 410, the vehicle-side control device 220 acquires an environment sensing result related to environment surrounding the vehicle. The environment sensing result is based on sensing information collected by at least one sensor disposed in the environment and independent of the vehicle. The environment sensing result indicates relevant information about a plurality of objects in the environment. At block 420, the vehicle-side control device 220 determines a vehicle exterior sensing result of the vehicle by excluding a self-vehicle sensing result corresponding to the vehicle from the environment sensing result. At block 430, the vehicle-side control device 220 controls the driving behavior of the vehicle based at least on the vehicle exterior sensing result.

In some embodiments, controlling the driving behavior of the vehicle further includes: acquiring behavior prediction of at least one of a plurality of objects, the behavior prediction including at least one of: an expected moving trajectory of the at least one object, an expected moving speed of the at least one object and the expected moving direction of the at least one object; and controlling the driving behavior of the vehicle based on the behavior prediction of the at least one object.

In some embodiments, controlling the driving behavior of the vehicle further includes: acquiring an automatic driving recommendation for the vehicle, and the automatic driving recommendation includes at least one of: a travel route recommendation of the vehicle, a travel direction recommendation of the vehicle, and a recommendation of operational instructions for controlling the driving behavior of the vehicle; and controlling the driving behavior of the vehicle based on the automatic driving recommendation for the vehicle.

In some embodiments, determining the vehicle exterior sensing result of the vehicle includes: identifying, from the environment sensing result, identification information related to a label portion equipped to the vehicle; determining the self-vehicle sensing result corresponding to the vehicle in the environment sensing result based on the identification information; and excluding the self-vehicle sensing result from the environment sensing result to acquire the vehicle exterior sensing result.

In some embodiments, the label portion of the vehicle includes at least one of: a license plate of the vehicle, a two-dimensional code attached to exterior of the vehicle, a non-visible label attached to the exterior of the vehicle, and a radio frequency label mounted on the vehicle.

In some embodiments, the environment sensing result includes positions of the plurality of objects, and determining the vehicle exterior sensing result includes: determining a position of the vehicle; and identifying an object matching the vehicle from the plurality of objects by matching the position of the vehicle with the positions of the plurality of objects; and excluding the sensing result corresponding to the object matching the vehicle from the environment sensing result to acquire the vehicle exterior sensing result.

In some embodiments, the method 400 further includes: determining an approximate position of the vehicle in the environment; determining an object corresponding to the vehicle from the plurality of objects from the environmental sensing result based on the approximate position; and determining position information of the object corresponding to the vehicle included in the environment sensing result as a fine position of the vehicle in the environment.

In some embodiments, controlling the driving behavior of the vehicle also includes controlling the driving behavior of the vehicle based on the fine position of the vehicle.

In some embodiments, the at least one sensor includes at least one of: a sensor disposed near a road on which the vehicle is traveling; and a sensor that is integrated on other vehicles in the environment.

Roadside Exemplary Process

Figure 5:
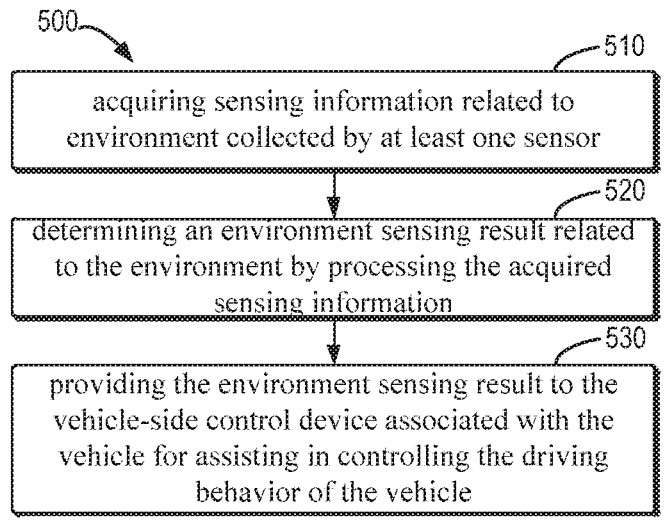
FIG. 5 is a flow chart of a process for assisting in controlling automatic driving of a vehicle according to an embodiment of the present disclosure.

FIG. 5 is a flow chart of a method 500 for assisting in controlling automatic driving of a vehicle according to embodiments of the present disclosure. The method 500 can be implemented by the roadside control device 210 of FIG. 2. At block 510, the roadside control device 210 acquires sensing information related to environment collected by at least one sensor. The at least one sensor is disposed in the environment and is independent of the vehicle. At block 520, the roadside control device 210 determines an environment sensing result related to the environment by processing the acquired sensing information, the environment sensing result indicating related information of a plurality of objects in the environment, the plurality of objects including the vehicle. At block 530, the roadside control device 210 provides the environment sensing result to the vehicle-side control device associated with the vehicle for assisting in controlling the driving behavior of the vehicle.

In some embodiments, the method 500 further includes: determining behavior prediction of at least one of the plurality of objects based on the environment sensing result, the behavior prediction including at least one of: an expected moving trajectory of the at least one object, an expected moving speed of the at least one object, and an expected moving direction of the at least one object; and providing the determined behavior prediction to the vehicle-side control device for further assisting in controlling the driving behavior of the vehicle.

In some embodiments, determining the behavior prediction includes: determining the behavior prediction using a prediction model specific to a region in which the at least one sensor is located. The prediction model is trained based on behaviors of another object in the region.

In some embodiments, the method 500 further includes: determining an automatic driving recommendation for the vehicle based on the environment sensing result, the automatic driving recommendation including at least one of: a travel route recommendation of the vehicle, a travel direction recommendation of the vehicle, and a recommendation of operational instructions for controlling the driving behavior of the vehicle; and providing the determined automatic driving recommendation to the vehicle-side control system for further assisting in controlling the driving behavior of the vehicle.

In some embodiments, determining the automatic driving recommendation includes: determining the automatic driving recommendation using a recommendation model specific to a region in which the at least one sensor is located, the recommendation model being trained based on driving behaviors performed by another vehicle in the region.

In some embodiments, determining the environment sensing result includes: acquiring a static high-precision map associated with the environment, the static high-precision map at least indicating a position of the static object in the environment; and determining the environment sensing result based on the sensing information and the static high-precision map.

In some embodiments, determining the environment sensing result based on the sensing information and the static high-precision map includes: updating the static high-precision map with the sensing information to acquire a real-time high-precision map associated with the environment as an environment sensing result.

In some embodiments, the sensing information includes image sensing information, and determining environment sensing result based on the sensing information and the static high-precision maps includes: identifying the static objects and other objects in the environment from the image sensing information; and determining positions of other objects according to the position of the static object indicated by the static high-precision map based on a relative position relationship between the static object and the other objects in the image sensing information.

In some embodiments, providing a vehicle exterior vehicle sensing result to the vehicle-side control device includes: determining the vehicle exterior sensing result of the vehicle by excluding a vehicle sensing result corresponding to the vehicle from the environment sensing result; and transmitting the vehicle exterior sensing result to the vehicle-side control device.

In some embodiments, determining the vehicle exterior sensing result of the vehicle includes: identifying, from the environment sensing result, identification information related to a label portion equipped to the vehicle; determining the self-vehicle sensing result corresponding to the vehicle in the environment sensing result based on the identification information; and excluding the self-vehicle sensing result from the environment sensing result to acquire the vehicle exterior sensing result.

In some embodiments, the label portion equipped to the vehicle includes at least one of: a license plate of the vehicle, a two-dimensional code attached to the exterior of the vehicle, a non-visible label attached to the exterior of the vehicle, and a radio frequency label mounted on the vehicle.

In some embodiments, the at least one sensor includes at least one of: a sensor disposed near a road on which the vehicle is traveling; and a sensor that is integrated on other vehicles in the environment.

Exemplary Device Implementation

Figure 6:
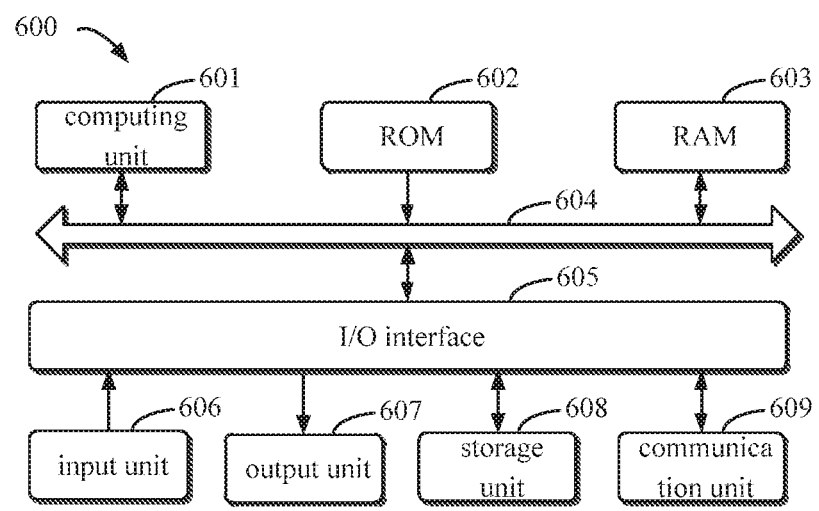
FIG. 6 is a block diagram of a computing device capable of implementing various embodiments of the present disclosure.

FIG. 6 is a block diagram of an exemplary device 600 capable of performing various embodiments of the present disclosure. The device 600 may be used to realize the roadside assist device 210 or vehicle-side control device 220 illustrated in FIG. 2. As illustrated in FIG. 6, the device 600 includes a computing unit 601 that may perform various appropriate actions and processes according to computer program instructions stored in a read only memory (ROM) 602 or computer program instructions loaded to a random access memory (RAM) 603 from a storage unit 608. In the RAM 603, various programs and data required by the operations of the device 600 can also be stored. The computing unit 601, the ROM 602, and the RAM 603 are coupled to each other through a bus 604. An input/output (I/O) interface 605 is also coupled to the bus 604.

A plurality of components in the device 600 are coupled to the I/O interface 605, including: an input unit 606, such as a keyboard, a mouse, and the like; an output unit 607, such as various types of displays, loudspeakers; a storage unit 608, such as a disk, an optical disk, and the like; and a communication unit 609, such as a network card, a modem, a wireless communication transceiver. The communication unit 609 allows the device 600 to exchange information/data with other devices over a computer network such as the Internet and/or various telecommunication networks.

The computing unit 601 can be a variety of general purpose and/or special purpose processing components with processing and computing capabilities. Some examples of the computing unit 601 include, but are not limited to, a central processing unit (CPU), a graphics processing unit (GPU), various specialized artificial intelligence (AI) computing chips, various computing units that run machine learning model algorithms, digital signal processor (DSP), and any suitable processors, controllers, and microcontrollers. The computing unit 601 can perform various methods and processes described above, such as the process 400 or the process 500. For example, in some embodiments, the process 400 or the process 500 can be implemented as a computer software program that is tangibly embodied in a machine readable medium, such as the storage unit 608. In some embodiments, some or all of the computer program can be loaded and/or installed onto the device 600 via the ROM 602 and/or the communication unit 609. One or more steps of the process 400 or the process 500 described above may be performed when the computer program is loaded into the RAM 603 and executed by the computing unit 601. Alternatively, in other embodiments, the computing unit 601 can be configured to perform the process 400 or the process 500 by any other suitable means (e.g., by means of firmware).

The functions described above herein may be performed, at least in part, by one or more hardware logic components. By way of example but not limitation, exemplary types of hardware logic components that may be used include: a field programmable gate array (FPGA), an application specific integrated circuit (ASIC), an application specific standard product (ASSP), a system on a chip (SOC), a complex programmable logic device (CPLD), and the like.

Program codes for implementing the methods of the present disclosure can be written in any combination of one or more programming languages. The program codes may be provided to a general purpose computer, a special purpose computer or a processor or controller of other programmable data processing device, such that the program code, when executed by the processor or controller, causes the functions/operations specified in the flowcharts and/or block diagrams to be implemented. The program codes may execute entirely on the machine, partly on the machine, partly on the machine as a stand-alone software package and partly on the remote machine or entirely on the remote machine or a server.

In the context of the present disclosure, a machine-readable medium can be a tangible medium that can contain or store a program for use by or in combination with an instruction execution system, apparatus, or device. The machine readable medium can be a machine readable signal medium or a machine readable storage medium. The machine-readable medium can include, but is not limited to, an electronic, magnetic, optical, electromagnetic, infrared, or semiconductor system, apparatus, or device, or any suitable combination of the foregoing. More specific examples of the machine readable storage medium may include electrical connections based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the foregoing.

In addition, although the operations are depicted in a particular order, this should be understood to require that such operations be performed in the particular order shown or in a sequential order, or that all illustrated operations should be performed to achieve the desired results. Multitasking and parallel processing may be advantageous in certain circumstances. Likewise, although several specific implementation details are included in the above discussion, these should not be construed as limiting the scope of the disclosure. Certain features that are described in the context of separate embodiments can also be implemented in combination in a single implementation. Conversely, various features that are described in the context of a single implementation can be implemented in a plurality of implementations, either individually or in any suitable sub-combination.

Although the subject matter has been described in a language specific to structural features and/or methodological acts, it is understood that the subject matter defined in the appended claims is not limited to the specific features or acts described above. Instead, the specific features and acts described above are merely exemplary forms of implementing the claims.

What is claimed is:

1. A method for assisting in controlling automatic driving of a vehicle, the method comprising:
   acquiring sensing information related to environment collected by at least one sensor, the at least one sensor being disposed in the environment and independent of the vehicle;
   determining an environment sensing result related to the environment by processing the acquired sensing information, the environment sensing result indicating relevant information about a plurality of objects in the environment, the plurality of objects comprising the vehicle; and
   providing the environment sensing result to a vehicle-side control device associated with the vehicle for assisting in controlling a driving behavior of the vehicle;
   wherein providing the environment sensing result to the vehicle-side control device comprises:
   determining a vehicle exterior sensing result by excluding a self-vehicle sensing result corresponding to the vehicle from the environment sensing result; and
   transmitting the vehicle exterior sensing result to the vehicle-side control device;
   wherein determining the vehicle exterior sensing result comprises:
   identifying, from the environment sensing result, identification information related to a label portion equipped to the vehicle;
   determining the self-vehicle sensing result corresponding to the vehicle in the environment sensing result based on the identification information; and
   excluding the self-vehicle sensing result from the environment sensing result to acquire the vehicle exterior sensing result.

2. The method according to claim 1, further comprising:
   determining behavior prediction of at least one object of the plurality of objects based on the environment sensing result, the behavior prediction comprising at least one of: an expected moving trajectory of the at least one object, an expected moving speed of the at least one object, and an expected moving direction of the at least one object; and
   providing the determined behavior prediction to the vehicle-side control device for further assisting in controlling the driving behavior of the vehicle.

3. The method according to claim 2, wherein determining the behavior prediction comprises:
   determining the behavior prediction using a prediction model specific to a region in which the at least one sensor is located, the prediction model being trained based on behaviors of another object in the region.

4. The method according to claim 1, further comprising:
determining an automatic driving recommendation for the vehicle based on the environment sensing result, the automatic driving recommendation comprising at least one of: a travel route recommendation of the vehicle, a travel direction recommendation of the vehicle, and a recommendation of operational instructions for controlling the driving behavior of the vehicle; and
providing the determined automatic driving recommendation to the vehicle-side control device for further assisting in controlling the driving behavior of the vehicle.

5. The method according to claim 4, wherein determining the automatic driving recommendation comprises:
determining the automatic driving recommendation using a recommendation model specific to a region in which the at least one sensor is located, the recommendation model being trained based on driving behaviors performed by another vehicle in the region.

6. The method according to claim 1, wherein determining the environment sensing result comprises:
acquiring a static high-precision map associated with the environment, the static high-precision map at least indicating a position of a static object in the environment; and
determining the environment sensing result based on the sensing information and the static high-precision map.

7. The method according to claim 6, wherein determining the environment sensing result based on the sensing information and the static high-precision map comprises:
updating the static high-precision map with the sensing information to acquire a real-time high-precision map associated with the environment as the environment sensing result.

8. The method according to claim 6, wherein the sensing information comprises image sensing information, and determining the environment sensing result based on the sensing information and the static high-precision map comprises:
identifying the static object and other objects in the environment from the image sensing information; and
determining positions of other objects according to the position of the static object indicated by the static high-precision map based on a relative position relationship between the static object and the other objects in the image sensing information.

9. A device for assisting in controlling automatic driving of a vehicle, comprising:
one or more processors; and
a storage device, configured to store one or more programs that, when executed by the one or more processors, causes the one or more processors to perform a method or assisting in controlling automatic driving of a vehicle, the method comprising:
acquiring sensing information related to environment collected by at least one sensor, the at least one sensor being disposed in the environment and independent of the vehicle;
determining an environment sensing result related to the environment by processing the acquired sensing information, the environment sensing result indicating relevant information about a plurality of objects in the environment, the plurality of objects comprising the vehicle; and
providing the environment sensing result to a vehicle-side control device associated with the vehicle for assisting in controlling a driving behavior of the vehicle;
wherein providing the environment sensing result to the vehicle-side control device comprises:
determining a vehicle exterior sensing result by excluding a self-vehicle sensing result corresponding to the vehicle from the environment sensing result; and
transmitting the vehicle exterior sensing result to the vehicle-side control device;
wherein determining the vehicle exterior sensing result comprises:
identifying, from the environment sensing result, identification information related to a label portion equipped to the vehicle;
determining the self-vehicle sensing result corresponding to the vehicle in the environment sensing result based on the identification information; and
excluding the self-vehicle sensing result from the environment sensing result to acquire the vehicle exterior sensing result.

10. The device according to claim 9, wherein the method further comprises:
determining behavior prediction of at least one object of the plurality of objects based on the environment sensing result, the behavior prediction comprising at least one of: an expected moving trajectory of the at least one object, an expected moving speed of the at least one object, and an expected moving direction of the at least one object; and
providing the determined behavior prediction to the vehicle-side control device for further assisting in controlling the driving behavior of the vehicle.

11. The device according to claim 10, wherein determining the behavior prediction comprises:
determining the behavior prediction using a prediction model specific to a region in which the at least one sensor is located, the prediction model being trained based on behaviors of another object in the region.

12. The device according to claim 9, wherein the method further comprises:
determining an automatic driving recommendation for the vehicle based on the environment sensing result, the automatic driving recommendation comprising at least one of: a travel route recommendation of the vehicle, a travel direction recommendation of the vehicle, and a recommendation of operational instructions for controlling the driving behavior of the vehicle; and
providing the determined automatic driving recommendation to the vehicle-side control device for further assisting in controlling the driving behavior of the vehicle.

13. The device according to claim 12, wherein determining the automatic driving recommendation comprises:
determining the automatic driving recommendation using a recommendation model specific to a region in which the at least one sensor is located, the recommendation model being trained based on driving behaviors performed by another vehicle in the region.

14. The device according to claim 9, wherein determining the environment sensing result comprises:
acquiring a static high-precision map associated with the environment, the static high-precision map at least indicating a position of a static object in the environment; and
determining the environment sensing result based on the sensing information and the static high-precision map.

15. The device according to claim 14, wherein determining the environment sensing result based on the sensing information and the static high-precision map comprises:

updating the static high-precision map with the sensing information to acquire a real-time high-precision map associated with the environment as the environment sensing result.

16. The device according to claim 14, wherein the sensing information comprises image sensing information, and determining the environment sensing result based on the sensing information and the static high-precision map comprises:
   identifying the static object and other objects in the environment from the image sensing information; and
   determining positions of other objects according to the position of the static object indicated by the static high-precision map based on a relative position relationship between the static object and the other objects in the image sensing information.

17. A vehicle infrastructure cooperative system, comprising:
   at least one sensor disposed in environment and independent of a vehicle, configured to collect sensing information related to the environment;
   a roadside assist device comprising a device for assisting in controlling automatic driving of a vehicle, the device for assisting in controlling automatic driving of a vehicle comprising:
      one or more processors; and
      a storage device, configured to store one or more programs that, when executed by the one or more processors, causes the one or more processors to perform a method or assisting in controlling automatic driving of a vehicle, the method comprising:
      acquiring sensing information related to environment collected by at least one sensor, the at least one sensor being disposed in the environment and independent of the vehicle;
      determining an environment sensing result related to the environment by processing the acquired sensing information, the environment sensing result indicating relevant information about a plurality of objects in the environment, the plurality of objects comprising the vehicle; and
      providing the environment sensing result to a vehicle-side control device associated with the vehicle for assisting in controlling a driving behavior of the vehicle;
      wherein providing the environment sensing result to the vehicle-side control device comprises:
      determining a vehicle exterior sensing result by excluding a self-vehicle sensing result corresponding to the vehicle from the environment sensing result; and
      transmitting the vehicle exterior sensing result to the vehicle-side control device;
      wherein determining the vehicle exterior sensing result comprises:
      identifying, from the environment sensing result, identification information related to a label portion equipped to the vehicle;
      determining the self-vehicle sensing result corresponding to the vehicle in the environment sensing result based on the identification information; and
      excluding the self-vehicle sensing result from the environment sensing result to acquire the vehicle exterior sensing result; and
   a vehicle-side control device, configured to control a driving behavior of the vehicle based on the environment sensing result provided by the roadside assist device.

* * * * *